(No Model.)
C. H. SCOFIELD.
ADJUSTABLE CAMERA AND BOX COMBINED.
No. 329,599. Patented Nov. 3, 1885.
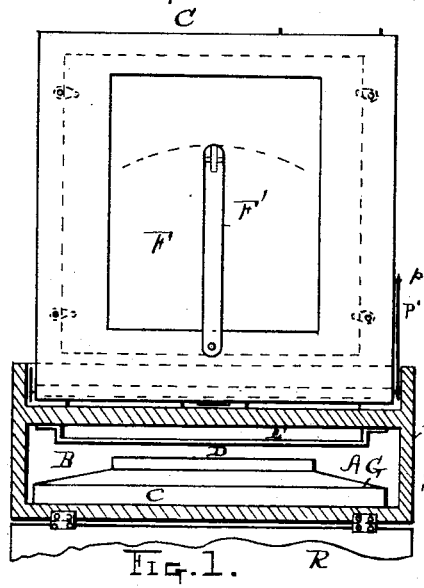
Fig. 1.
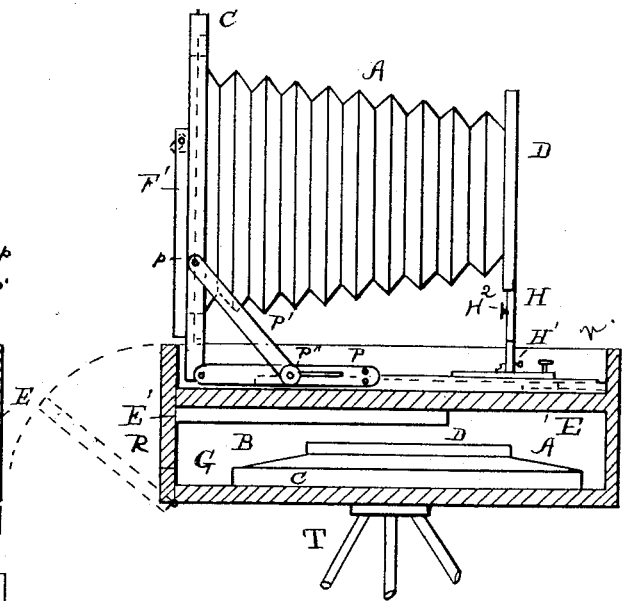
Fig. 3.
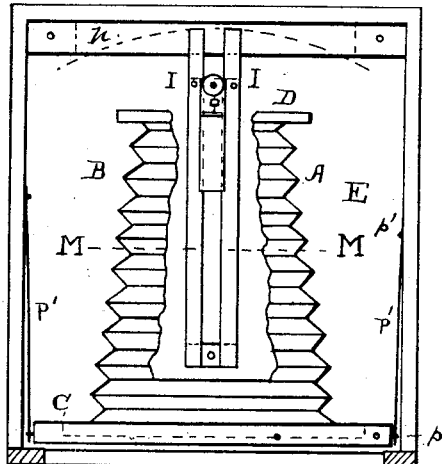
Fig. 2.
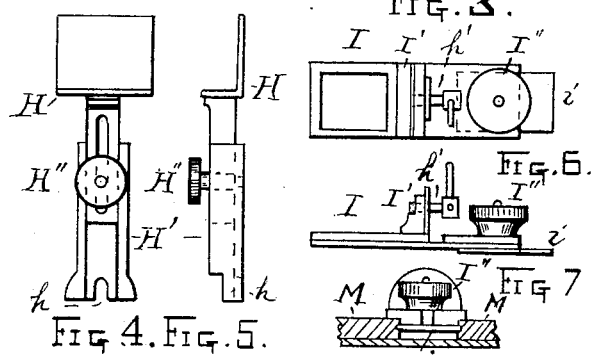
Fig. 4. Fig. 5.
Fig. 6.
Fig. 7.
Fig. 8.
Fig. 9.
Fig. 10.
Fig. 11.
Fig. 12.
WITNESSES:
Pierrepont Bartow.
William Champlin.
INVENTOR.
Charles H. Scofield

UNITED STATES PATENT OFFICE.

CHARLES H. SCOFIELD, OF UTICA, NEW YORK.

ADJUSTABLE CAMERA AND BOX COMBINED.

SPECIFICATION forming part of Letters Patent No. 329,599, dated November 3, 1885.

Application filed February 25, 1884. Serial No. 121,895. (No model.)

*To all whom it may concern:*

Be it known that I, CHARLES H. SCOFIELD, of the city of Utica, county of Oneida, and State of New York, a citizen of the United States, have invented and discovered a new and useful Improvement in Adjustable Camera and Box Combined, of which the following is the specification.

My invention relates to an improvement in adjustable camera and box combined; and it consists, first, in a simple and efficient method of adjusting the camera to the top of a box, which forms a stand or support for the camera when in use, and secures a safe and suitable place for packing the camera to be carried in the hand by means of a box of suitable size and depth; second, a simple and efficient means of adjusting the camera for use by the mechanism hereinafter described.

In the accompanying drawings, Figure 1 represents the end view of the camera and box combined. Fig. 2 represents a top view of the camera in sections. Fig. 3 represents a sectional side view of the camera and the box, and the dotted lines represent the motion of the lid to the box. Fig. 4 represents an adjustable slide, one end attached to the front of the camera, and the other end provided with a slot adapted to fit closely onto a screw attached to the top of the camera-box and adapted to slide longitudinally for the purpose of raising or lowering the front of the camera. The same is provided with a set-screw to hold the slide in place. Fig. 5 represents a side view of the same. Fig. 6 represents a top view of a slide provided on the outer edge with bearings and adapted to slide between strips attached to the top of the camera-box, and provided with a set-screw at one end to hold the camera in place when adjusted, and provided at about the center with an upward-projecting shoulder, into which a screw is fitted to receive the slotted end of the adjustable slide, Fig. 4, and adapted to hold said slide closely against the shoulder when the camera is in place. Fig. 7 represents a side view of the same. Fig. 8 represents a cross-section of the guides which are attached to the top of the camera-box, with the slide in place between the guides, as indicated in Fig. 2. Fig. 9 is a side view of the section of the guides and an end view of a cross-guide attached to the top and front of the camera-box. This cross-guide may be straight or circular, and is adapted to hold the guides in place and to leave them free to be laterally adjusted. The end toward the rear of the camera-box is fastened to the top of the box by means of a screw or rivet, as indicated in Fig. 2. Fig. 10 represents adjustable springs. The longer spring is attached to the upper projecting edge on the rear of the camera-box with screws or rivets, provided with a hole in the end of the spring with a longitudinal slot in the same. The shorter spring is provided at one end with a circular hole, and is attached to the long spring by a slide and set-screw, and adapted to move backward and forward in the longitudinal groove, and is adapted to hold in an upright or angular position the rear of the camera-box, the lower edge of which is attached and held in position by projecting pivots fitting into the spring, as indicated in Fig. 3. Fig. 11 is a top view of a section of the camera-box with the springs attached. Fig. 12 represents a square metallic plate which is attached to the two angles of the rear of the box.

Having described the nature and construction of my invention, I will now describe it by reference to the accompanying drawings, in which—

A represents an expanding and contracting body of a camera, constructed of rubber cloth or any other suitable material, and adapted to open and close into a compact space.

B represents the camera-box, constructed of wood, and about fourteen inches square, and about four and one-half inches in depth. This, however, can be enlarged or diminished to such size as to receive the camera when folded.

C represents the rear of the camera, provided with an ordinary focus-glass adapted to fit into the outer surface of the box, and held in place by a button, and so constructed that it is reversible, so as to give a broader or a longer picture or photograph. C is so adjusted to the camera-body that the same can be removed by two buttons, and then can be reversed longitudinally or perpendicularly, according to the wish of the operator.

D represents the front of the camera, provided with suitable lens.

E represents the top of the camera-box.

E' represents a shelf or recess in the top of the camera-box, adapted to hold the focus-glass.

F represents the focus-glass in the rear of the camera.

F' represents an adjustable arm resting against the back of the plate-holder, with a movable button or stop at the end, adapted to hold the prepared plate in position when the camera is in use by turning the button at the end of the arm inward, so that the end will rest against the glass, which is held securely in place by the spring in the arm.

G represents the camera folded into compact space and placed inside of the box.

H represents the upper part of an adjustable slide which is fastened by screws or rivets to the front of the camera, and is provided with a longitudinal slot.

H' represents the lower portion of the adjustable slide, and is provided with a longitudinal groove, and so adjusted as to fit closely the other section of the slide, provided at the lower end with a recess and in the center with a set-screw.

H'' is a set-screw adapted to hold the adjustable slide securely in position, the whole so adjusted and adapted as to raise or lower the front of the camera.

h represents the slot in the lower end of the adjustable slide, and adapted to fit h' in Figs. 6 and 7.

I represents a horizontal adjustable slide, provided in the center with an upward-projecting shoulder, I', into which a vise-screw with a projecting handle or lever is fitted, so as to receive h and securely hold the same in position, as indicated in Fig. 3.

I'' represents the set-screw, which is attached to i, and adapted to tighten and hold securely in place the slide between the guides, as indicated in Fig. 2.

i is a projecting plate of metal, which fits into grooves in the slide, and is attached to I by means of the set-screw, and adapted to move backward and forward to regulate the front of the camera, either to hold the same upright, or at an angle, and so constructed as to fit between the guides, as indicated in Fig. 8.

M represents two guides attached to the top of the camera-box, with the inner surface rabbeted to receive slide I between them, as indicated in Fig. 8, the rear ends of the guides attached to the camera-box by screw or rivet, the other end provided with slots which fit into a cross or circular guide, and the two guides adapted to move horizontally in either direction to suit the wishes of the operator, as indicated in Figs. 2 and 9.

n represents a strip of wood or metal placed across the front of the box in the slot provided in the track or way, which fits over the same, as indicated in Fig. 9, to keep the track or way in place, and to allow the same to move horizontally to give the lens a side motion to bring it into an angular position in reference to the sensitized plate or focusing-glass.

P represents a spring attached to the upward-projecting edge of the box, provided with a longitudinal slot and a circular aperture in one end. This spring is attached to the upper edge of the box, as indicated in Fig. 11, by means of screws or rivets. The rear end of the spring is bent outward, and is left to be adjusted and operated backward and forward by pressure.

P' is a spring adapted to fit closely against P, provided at the end with an aperture and attached to P by set-screw P'', which is adapted to move the spring P' backward and forward to hold the rear of the camera in an upright or angular position, both springs adapted to hold the rear of the camera rigidly by means of set-screw P''. The camera is detachable from the box, as indicated in Fig. 3, by loosening the screw on longitudinal slide I, which releases the upright slide H, detaching the front of the camera. The rear is detached by pressing the springs P and P' outward. The camera can then be folded compactly and inserted in the box, and the top of the camera-box is used as the stand or surface upon which the camera is placed when in use.

p represents a projecting pivot, over which spring P' fits.

p' represents a pivot at the lower angle of the rear of the camera, which forms the support of the camera-frame, over which springs P fit, thereby forming a fulcrum, which operates to hold the rear of the camera in position either upright or at an angle, according to the will of the operator.

S represents a metallic plate which fits onto the outer edge of the box to protect springs P P'. When the camera is not in use, it is detached from the box, folded compactly, and inserted in the box through door R, which is then closed and locked, and is provided on the upper side with a handle, so that the whole may be carried.

T represents an ordinary tripod, to which the camera-box is attached by means of a screw, and is so adjusted as to be detached from the box readily when the operator is through with the use of the camera.

What I claim as my invention, and desire to secure by Letters Patent, is—

1. The herein-described detachable camera A, adapted to open and close into a compact space, as described, in combination with the box B, provided on the upper surface with moving ways or guides M M, pivoted to the upper surface of the box and adapted to move horizontally to bring the lens at an angle with the focusing-glass, as described.

2. The camera A, in combination with a carrying-box having on its outer surface a track or way attached to the same, provided with suitable means to swing or move the tracks horizontally, as described.

3. The camera A, in combination with a carrying-box provided on the outer surface with oscillating track, one end pivoted to the box, the other end guided and held by cross-guide n, as described, as and for the purposes stated.

4. The combination, with a camera and box, of springs P and P', adapted to hold the camera at any desired angle by means of slots and set-screws, as described, the camera being removable by disengaging the springs from the projecting pins in the outer rear surfaces of the camera, as described.

5. In a camera, the box B, in combination with springs P and P', adapted to hold the rear of the camera in an upright or angular position by means of a slot and set-screw, as described, as and for the purposes stated.

6. In a camera, the projecting arm F', provided at the end with a button, and attached to the frame by a screw adapted to hold the glass in position when the impression is taken, as described, as and for the purposes stated.

7. The combination of a photographic camera, a frame at the rear of the bellows having a square recess in the front surface corresponding in size with the rear of the bellows, provided with suitable means of attaching the frame to the bellows either horizontally or vertically.

Signed at Utica, in the county of Oneida and State of New York.

CHARLES H. SCOFIELD.

Witnesses:
C. D. F. HOXIE,
H. M. LOVE.